US009945035B2

(12) United States Patent
Park et al.

(10) Patent No.: US 9,945,035 B2
(45) Date of Patent: Apr. 17, 2018

(54) METHOD OF MANUFACTURING NON-SLIP PLATE AND NON-SLIP PLATE MANUFACTURED THEREBY

(71) Applicants: Jong-Su Park, Busan (KR); Jun Park, Busan (KR)

(72) Inventors: Jong-Su Park, Busan (KR); Jun Park, Busan (KR)

(*) Notice: Subject to any disclaimer, the term of this patent is extended or adjusted under 35 U.S.C. 154(b) by 22 days.

(21) Appl. No.: 15/052,979

(22) Filed: Feb. 25, 2016

(65) Prior Publication Data
US 2017/0247796 A1 Aug. 31, 2017

(51) Int. Cl.
B23K 1/00 (2006.01)
C23C 24/10 (2006.01)
B23K 1/19 (2006.01)
C22C 27/04 (2006.01)
B23K 1/008 (2006.01)
B23K 103/18 (2006.01)

(52) U.S. Cl.
CPC ............ C23C 24/106 (2013.01); B23K 1/19 (2013.01); B23K 1/008 (2013.01); B23K 2203/18 (2013.01); C22C 27/04 (2013.01)

(58) Field of Classification Search
CPC ........... B23K 1/008; B23K 1/012; B23K 1/00
USPC ................ 28/42, 203, 219, 262.51
See application file for complete search history.

(56) References Cited

U.S. PATENT DOCUMENTS

| 3,524,774 | A | 8/1970 | Volker et al. |
| 7,262,240 | B1 | 8/2007 | Breton et al. |
| 2003/0111459 | A1* | 6/2003 | Nishimura ............ B23K 1/012 219/615 |
| 2007/0017160 | A1* | 1/2007 | Caldwell ............... B24D 3/00 51/298 |
| 2014/0027412 | A1 | 1/2014 | Kato et al. |

FOREIGN PATENT DOCUMENTS

| DE | 1 180 226 B | 10/1964 |
| DE | 1 508 331 B1 | 4/1971 |
| DE | 38 29 033 A1 | 3/1989 |

OTHER PUBLICATIONS

Office Action in German Patent Application No. 10 2016 200 679.7, dated Dec. 21, 2016.
B. Predel, "Phase Equilibria, Crystallographic and Thermodynamic Data of Binary Alloys," Landolt-Börnstein: Numerical data and functional relationships in science and technology, New Series, Group IV: Physical Chemistry, 1998, vol. 5, pp. 50-51.
Normenausschuss Schweißtechnik (NAM) im DIN "Schweißen und verwandte Prozesse, Begriffe, Teil 2: Weichlöten, Hartlöten und verwandte Begriffe," DIN, Mar. 2007, pp. 6, Berlin, Germany.

* cited by examiner

Primary Examiner — Erin B Saad
(74) Attorney, Agent, or Firm — Baker & Hostetler LLP

(57) ABSTRACT

Disclosed are a method of manufacturing a non-slip plate and a non-slip plate manufactured thereby. The method includes preparing a base metal plate for joint design, washing and surface treatment, preparing a non-slip material, adhering the non-slip material to the bonding surface of the base metal plate to form a protrusion, and brazing the base metal plate having the non-slip material adhered thereto in a brazing furnace. The non-slip plate is applied to vehicles to impart non-slip performance thereto, and can be semi-permanently used.

4 Claims, 5 Drawing Sheets

METHOD OF MANUFACTURING NON-SLIP PLATE AND NON-SLIP PLATE MANUFACTURED THEREBY

BACKGROUND OF THE INVENTION

1. Technical Field

The present invention relates to a method of manufacturing a non-slip plate and a non-slip plate manufactured thereby and, more particularly, to a method of manufacturing a non-slip plate having non-slip performance and a non-slip plate manufactured thereby.

2. Description of the Related Art

A non-slip plate is provided under the door of a vehicle so that a passenger may safely board the vehicle. Since sport utility vehicles (SUVs), trucks, buses, etc. are configured such that the boarding height thereof is high, boarding is difficult in the absence of a non-slip plate capable of assisting passengers in boarding. Therefore, a non-slip plate is provided for safe boarding.

However, the conventional non-slip plate is manufactured in such a manner that the step portion, on which a passenger steps, is made of a synthetic resin or a rubber material and the surface thereof is provided with protrusions in a lattice or diamond arrangement to prevent passengers from slipping, undesirably causing fast wear and deteriorating non-slip performance.

SUMMARY OF THE INVENTION

Therefore, the present invention has been made keeping in mind the problems encountered in the related art, and an object of the present invention is to provide a method of manufacturing a non-slip plate and a non-slip plate manufactured thereby, in which heterogeneous metal particles are attached to a rigid base metal plate (a metal plate) to impart non-slip performance, whereby high manufacturing efficiency and an aesthetic outer appearance may be exhibited, without wear or peeling problems.

In order to accomplish the above object, the present invention provides method of manufacturing a non-slip plate, comprising: preparing a base metal plate for joint design, washing and surface treatment; preparing a non-slip material; adhering the non-slip material to the bonding surface of the base metal plate to form a protrusion; and brazing the base metal plate having the non-slip material adhered thereto in a brazing furnace.

The base metal plate may comprise any one selected from among stainless steel, iron, copper, brass, and alloy steel.

The non-slip material may be configured such that a tungsten powder, at least one metal powder selected from among silver, copper, zinc, cadmium, phosphorus, nickel, manganese, tin, indium, gold, silicon, palladium, and lithium, and a solvent are mixed.

The non-slip material may be configured such that 95 to 97 wt % of a tungsten powder and 3 to 5 wt % of a nickel powder are mixed and diluted with a solvent.

The brazing may comprise primary firing at 500 to 700° C. in a brazing furnace in a reduction gas atmosphere and secondary firing in the brazing furnace at a temperature increased to 900 to 1350° C.

The reduction gas may be a hydrogen gas, and the hydrogen gas may be used in an amount ranging from 76% to 100%.

The dew point may be −55° C. or lower.

In addition, the present invention provides a non-slip plate, comprising a base metal plate and a non-slip part attached to the surface of the base metal plate to impart non-slip performance.

The base metal plate may be distinguished from the non-slip part by a laser marking around the non-slip part.

According to the present invention, the non-slip plate is configured such that a base metal plate and a non-slip material can be strongly adhered to each other, and can exhibit superior wear resistance and non-slip performance. Thus, the non-slip plate can be applied to vehicles or facilities requiring non-slip performance so as to manifest non-slip performance, and can also be semi-permanently used.

In particular, a brazing process is performed through a reduction reaction in a hydrogen gas atmosphere at a dew point of −55° C. or less, whereby the adhesion between the base metal plate and the non-slip material is further increased, and impurities such as oxides can be completely removed in the brazing process, thus attaining a non-slip plate having an aesthetic outer appearance as well as excellent non-slip performance.

Furthermore, tungsten powder, which was conventionally discarded, can be recycled, thus decreasing the cost of manufacturing the non-slip plate.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE SPECIFIC EMBODIMENTS

Hereinafter, a detailed description will be given of embodiments of the present invention with reference to the appended drawings.

Figure 1:
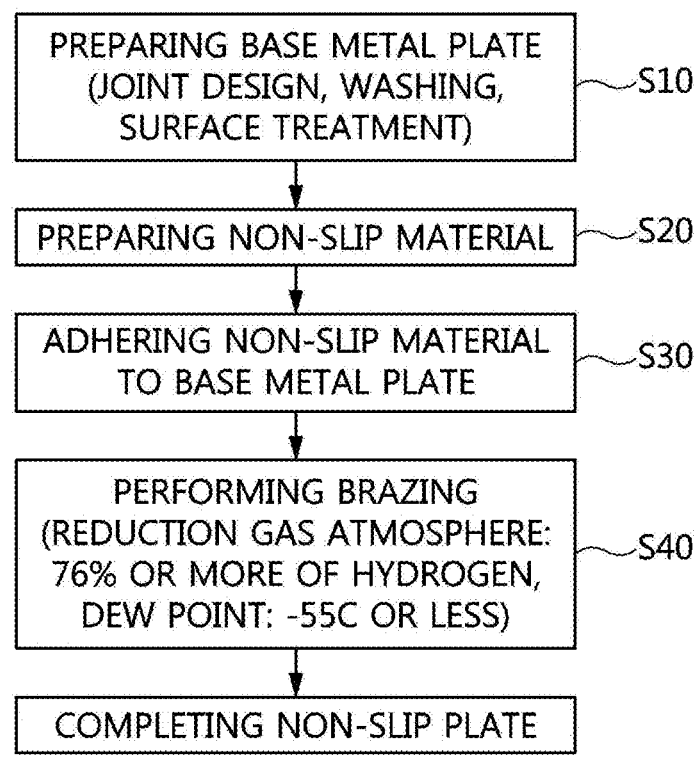
FIG. 1 is a flowchart illustrating the process of manufacturing a non-slip plate according to an embodiment of the present invention.

According to the present invention, the method of manufacturing a non-slip plate comprises, as illustrated in FIG. 1, preparing a base metal plate for joint design, washing and surface treatment (S10), preparing a non-slip material (S20), adhering the non-slip material to the bonding surface of the base metal plate so as to form a protrusion (S30), and brazing the base metal plate having the non-slip material adhered thereto in a brazing furnace (S40).

In the preparation of the base metal plate (S10), the base metal plate is designed so as to be adapted for brazing. Particularly, capillary action, which is regarded as very important in the brazing process, may be efficiently utilized through appropriate joint design.

The joint design is performed to determine the shape of the joint between the non-slip material and the base metal plate, joint clearance, etc. With regard to joint clearance, heterogeneous metals have different coefficients of thermal expansion, and thus the joint clearance is determined taking into consideration the coefficient of thermal expansion of the base metal plate and the non-slip material at the brazing temperature.

The joint design may be carried out using a laser.

The base metal plate is made of any one material selected from among stainless steel, iron, copper, brass, and alloy steel. Preferably useful as the material for the base metal plate is SUS304.

SUS304 has a chemical composition of 18Cr-8Ni, and is easy to use to form a design required by consumers because of the high processability thereof, and also makes it easy to upgrade the outer appearance of a product by marking letters or colors thereon using a laser.

Also, SUS304 is inexpensive and thus facilitates mass production, and may exhibit superior corrosion resistance and oxidation resistance, thereby being rust-resistant, and is excellent in high-temperature strength and low-temperature strength. The melting point of SUS304 falls in the range of 1400 to 1450° C.

The washing process is performed to clean the base metal plate. This is because capillary action is efficiently carried out when the base metal plate is clean. If oil, grease, rust, scale, paint remnants, physical contaminants (dust, foreign materials) and the like are present on the base metal plate, the base metal plate is not efficiently bonded with the non-slip material.

Factors that impede wetting, flow and diffusion of the base metal plate and the non-slip material have to be removed from the base metal plate. In the case where such factors are left behind on the base metal plate, the flow of the non-slip material is impeded or bubbles are generated, undesirably deteriorating the bonding strength of the joint between the base metal plate and the non-slip material.

The washing process may include any one or a combination of two or more selected from among alkaline cleaning, solvent degreasing, cleaner washing, acid pickling, ultrasonic washing, and fast water spraying.

Typically, the surface of a metal is coupled with oxygen in air to form an oxide layer. In order to remove complicated impurities such as scale, physical contaminants and the like, the combination of two or more washing processes is preferable, rather than a single washing process.

The surface treatment of the base metal plate may include mechanical polishing.

In the preparation of the non-slip material (S20), the material that is to be attached to the base metal plate to impart non-slip performance is prepared.

The non-slip material is obtained by mixing a tungsten powder, at least one metal powder selected from among silver, copper, zinc, cadmium, phosphorus, nickel, manganese, tin, indium, gold, silicon, palladium, and lithium, and a solvent.

Tungsten (W) has high hardness and may be semi-permanently used because strong non-slip performance is maintained by super-hard particles.

Silver (Ag) alone is not strong, but exhibits high strength when coupled with another element. Also, silver alloys have high penetrability when melted, thus ensuring a strong joint. Thus, silver functions to lower the melting point upon brazing and to increase wettability and processability.

Copper (Cu) is advantageous in terms of ductility, thermal conductivity, electrical conductivity, corrosion resistance, and high penetrability, and is relatively inexpensive compared to silver and may thus be used as an alternative to silver.

Unlike silver, copper may be compounded with iron, nickel or any refractory alloy. Furthermore, when copper and silver are compounded at a weight ratio of 28:27, a eutectic alloy of 780° C. is formed, which is stronger than copper or silver and exhibits high ductility and good penetrability.

Zinc (Zn), having a low melting point, is useful for a brazing process, and may increase wettability and is inexpensive. However, if zinc is used excessively, it becomes brittle, and a metal alloy containing zinc may break upon heating for a long period of time or at a high temperature because of the low vaporization point of zinc.

Cadmium (Cd) has a low melting point and good wettability, like zinc. Furthermore, cadmium is more corrosion-resistant than zinc and may increase the fluidity of a silver alloy at low temperature. However, cadmium is brittle, has a low vaporization point, and is more expensive than zinc, and moreover its oxide is toxic. Thus, when a non-slip material containing cadmium is brazed, an air ventilator must be provided.

Phosphorus (P), having very high reactivity, may constitute a compound with copper based on the following two reasons: one reason is that a liquidus temperature is remarkably lowered and the other reason is that chemical activity is high. Phosphorus functions as an oxidant that consumes oxygen. When phosphorus is melted, it may be provided in the form of a wide, strong and thin film on the melted surface. An alloy comprising 92.8 wt % Cu/7.2 wt % P has high tensile strength but low ductility. Hence, silver is added to thus enhance rigidity and brittleness.

Nickel (Ni) functions to impart a silver alloy with rigidity and toughness. Also, nickel plays a role in increasing corrosion resistance and assists in wetting carbides or the like, which are difficult to dissolve. An alloy containing nickel may suppress corrosion at the brazing interface upon brazing of stainless steel. However, nickel has a high melting point (1453° C.) and deteriorates the flowability of the alloy for brazing. Hence, it may be effectively used in cases where the brazing gap is large.

Manganese (Mn) is a high-melting-point metal but its melting point is decreased to about 959° C. when alloyed at a ratio of 85 wt % Ag/15 wt % Mn. Manganese contributes to the formation of a strong ductile joint and increases wettability upon bonding of an alloy containing stainless steel, nickel or chromium. The strength of the alloy containing manganese is maintained without change even at high temperatures.

Tin (Sn) has a very low melting point and is thus used to decrease the melting point of an alloy. Also, tin functions to improve fluidity, wettability, and penetrability.

Indium (In) functions to decrease the melting point of an alloy upon brazing and to improve flowability.

Gold (Au) imparts an aesthetic color after brazing and increases corrosion resistance.

Silicon (Si) may decrease the melting point and may prevent the vaporization of zinc.

Palladium (Pd) functions to increase the wettability of nickel alloys and to minimize the intergranular corrosion of the base metal plate.

Lithium (Li) has high bondability to metals such as stainless steel due to its deoxidation activity.

In particular, the non-slip material is preferably prepared by mixing 95 to 97 wt % of a tungsten powder and 3 to 5 wt % of a nickel powder and diluting the mixture with a solvent.

The tungsten powder is a main component of the non-slip material, and the nickel powder is used to increase the bonding affinity of the base metal plate together with the tungsten powder. In addition to the nickel powder, at least one metal powder selected from among silver, copper, zinc, cadmium, phosphorus, manganese, tin, indium, gold, silicon, palladium, and lithium may be used.

The alloy of tungsten powder and nickel powder has high hardness and high wettability with a base metal plate (SUS304). The melting point of the tungsten powder is 3422° C., and nickel has a melting point of 1453° C. and is not decomposed but is stable upon brazing. The tungsten powder has an affinity to the base metal plate when alloyed with the nickel powder.

If the amount of the tungsten powder is less than 95 wt %, the amount of nickel is relatively increased, undesirably deteriorating the flowability of the alloy for brazing. On the other hand, if the amount thereof exceeds 97 wt %, the amount of nickel is relatively decreased, making it difficult to adhere the non-slip material to the base metal plate.

When the amount of the nickel powder is 3 wt % or more, the adhesion of the non-slip material and the base metal plate may be increased upon brazing, and corrosion may be suppressed at the brazing interface upon brazing. However, if the amount of the nickel powder exceeds 5 wt %, the flowability of the non-slip material is deteriorated. Since the flowability of the non-slip material is highly correlated with the outer appearance of the non-slip plate, the use of a non-slip material having poor flowability makes it impossible to manufacture a non-slip plate having an aesthetic outer appearance.

In order to improve the outer appearance of the non-slip plate, the tungsten powder and the nickel powder preferably have a particle size of 10 μm or less.

As a solvent, water is used to dilute the non-slip material, and the amount thereof is not particularly limited.

In the adhering process (S30), the non-slip material is adhered to the base metal plate.

The non-slip material is adhered to the bonding surface of the base metal plate through coating using a brush or the like, immersion, or automatic coating, thereby forming a protrusion on the base metal plate. Since the proportion of the non-slip material that is diluted may vary depending on the type of coating process, such as coating using a brush or the like, immersion, or automatic coating, the amount of the dilution solvent, that is, water, is not particularly limited.

In addition to water, the solvent may include a binder, a flux, etc.

The shape and properties of oxide that is formed may vary depending on the type of base metal plate upon brazing, but a metal oxide may be treated with the non-slip material.

For example, copper, brass or silver is a material for forming an oxide that is relatively easily removable, and entails no local overheating risk because of the high thermal conductivity thereof. Also, copper, brass or silver may minimize the formation of oxides by the use of a relatively low-temperature alloy non-slip material. In this case, the concentration of the non-slip material that is diluted with the solvent may be set to be relatively low.

Bronze containing aluminum, beryllium, silicon or titanium in a small amount requires a strong solvent because it forms a strong and stable oxide. Alloy steel containing chromium, vanadium and manganese may be drastically oxidized. Hence, more stable stainless steel having high chromium content requires a strong solvent.

The base metal plate having the non-slip material adhered thereto is naturally dried.

Since the oxide is mostly slowly formed in the temperature range from room temperature to about 537° C., the heating time does not significantly affect the formation of oxide. Hence, drying may be carried out through slow heating in the above temperature range.

As water is removed from the non-slip material and the non-slip material swells, the amount of oxide on the brazing surface is remarkably increased. Hence, slow heating or indirect heating is preferable. Indirect heating is performed by heating portions other than the surface to which the non-slip material is adhered.

Upon induction heating, the non-slip material and the base metal plate, which are metals, are rapidly heated. However, the solvent is maintained at a temperature hundreds of degrees lower than the non-slip material and the base metal plate. Thus, the solvent is boiled, and thus pores may be generated in the non-slip material. In the case where this problem occurs, power may be decreased and heating time may be increased, or a minimum amount of solvent may be used.

In the brazing process (S40), the base metal plate having the non-slip material adhered thereto is placed in a brazing furnace so that the non-slip material is firmly attached to the base metal plate.

Stainless steel and tungsten powder, which is a main component of the non-slip material, form a high-temperature alloy and thus are not attached to each other.

In particular, SUS304, comprising 18Cr-8Ni, has high Cr content, which makes it difficult to attach to a tungsten powder. Cr has a high oxygen affinity to form a Cr oxide. When a Cr oxide is produced from Cr that is stable, it is difficult to attach the non-slip material to SUS304.

In order to increase the strength of adhesion between the stainless steel and the tungsten powder in the brazing process, nickel is contained in the non-slip material, hydrogen gas is used as a reduction gas in the brazing process, and the dew point of the brazing furnace is maintained within the range of −55° C. or less.

The tungsten powder is the substantial non-slip material, and the nickel powder is added to suppress the corrosion of the interface of the joint upon brazing the stainless steel so as to increase the affinity of tungsten powder to Cr contained in stainless steel.

Specifically, the brazing process includes primary firing at 500 to 700° C. in a brazing furnace in a reduction gas atmosphere, and secondary firing in the brazing furnace at a temperature increased to 900 to 1350° C.

When the base metal plate having the non-slip material adhered thereto is placed in the brazing furnace and primarily fired at 500 to 700° C. in a reduction gas atmosphere, the solvent is decomposed and burned, and intergranular corrosion of the base metal plate is prevented. Subsequently, when secondary firing is performed at an increased temperature of 900 to 1350° C., the base metal plate and the non-slip material are firmly attached to each other.

Since chromium and tungsten are easy to oxidize, surface pollutants such as lubricant remnants generated during the manufacturing process or the oxide film are removed through thermal decomposition or reduction upon primary firing.

If the primary firing temperature is lower than 500° C., the solvent and the oxide film are not removed. On the other hand, if the primary firing temperature is higher than 700° C., defects such as swelling may occur due to the remaining solvent. When only the secondary firing is performed without the primary firing, the strength of adhesion between the base metal plate and the non-slip material may become weak due to the swelling between the base metal plate and the non-slip material.

If the secondary firing temperature is lower than 900° C., the non-slip material, which has a high melting point, is not melted but remains, making it difficult to firmly attach the base metal plate and the non-slip material to each other. On the other hand, if the secondary firing temperature is higher than 1350° C., the effect thereof is not increased.

The primary firing time is about 5 to 10 min, and the secondary firing time is about 5 to 20 min. If the primary firing time is less than 5 min, desired effects are difficult to ensure. On the other hand, if the primary firing time is longer than 10 min, the effect thereof is not increased. If the secondary firing time is less than 5 min, desired effects are difficult to ensure. On the other hand, if the secondary firing time is longer than 20 min, the effect thereof is not increased, and moreover, the base metal plate may crack.

In the brazing process, the reduction gas is hydrogen gas, and the hydrogen gas is used in an amount of 76% or more.

If the amount of hydrogen gas is less than 76%, the reduction reaction is not efficiently carried out due to the lack of hydrogen, which is a main medium of the reduction.

The tungsten powder is reducible in a hydrogen gas atmosphere and is sintered. Alternatively, ammonia gas may be used as the reduction gas, but ammonia gas itself is difficult to reduce. In the case where ammonia gas is used, it is difficult to convert ammonia gas into hydrogen gas, and an additional process for converting ammonia gas into hydrogen gas has to be implemented, thus complicating the brazing process.

Hydrogen may penetrate the joint between the base metal plate and the non-slip material, thus producing $CO_2$ and $H_2O$ while burning the solvent. Only the non-slip material is melted, while minerals containing crystal water or —OH in the solvent, water containing binders, water adsorbed to the solvent, and water and fats attached to the joint are burned.

In this procedure, penetration and diffusion occur between the base metal plate and the non-slip material due to wetting and capillary action, so that the base metal plate and the non-slip material are firmly attached to each other.

Even though the brazing process does not melt the base metal plate, an intermetallic compound may be formed at the interface of the joint through the reaction between the base metal plate and the melted non-slip material, or the base metal plate and the non-slip material may be firmly attached to each other due to the complicated reaction, similar to the dissolution of the base metal plate.

As for the intermetallic compound, two or more metal elements having a high affinity to each other are linked at a simple atomic ratio, thereby forming an independent compound having properties different from the component metals and represented by AmBn.

For example, Cr in stainless steel may react with Ni in the non-slip material to form a Cr—Ni intermetallic compound, or Cr in stainless steel may react with W in the non-slip material to form a Cr—W intermetallic compound. W is formed into an intermetallic compound with Cr because it becomes stable in a reducible atmosphere.

Specifically, a Cr—W intermetallic compound or Cr—Ni intermetallic compound may be formed at the interface of the joint between stainless steel and the non-slip material through the interaction of Ni, having corrosion resistance, in a reducible atmosphere for preventing the formation of Cr oxide and reducing W, or stainless steel and the non-slip material may be firmly attached to each other due to the complicated reaction, similar to the dissolution of stainless steel.

The dew point is set to −55° C. or less. When firing is performed in a hydrogen gas atmosphere at a dew point of −55° C. or less, the strength of adhesion between the base metal plate and the non-slip material is increased.

When the dew point is maintained at −55° C. or less in a hydrogen gas atmosphere, the melting point of W is lowered and Ni, having a high affinity to stainless steel, functions as a catalyst, whereby Cr and W are allowed to react, thus preventing the formation of Cr oxide, forming the Cr—W intermetallic compound or Cr—Ni intermetallic compound, and removing Cr oxide.

The dew point is the temperature at which the air becomes saturated and reaches equilibrium. Although the dew point is represented as a temperature value, it substantially designates humidity.

In the present embodiment, the brazing process is performed under conditions of hydrogen gas content of 76% or more and a dew point of −55° C. or less. This is because hydrogen functions to prevent oxygen from coming into contact with the metal surface during the brazing process to thus prohibit the surface oxidation of metal and remove the oxide film from the surface of metal through the reduction reaction represented by Chemical Reaction 1 below.

The removal of the oxide film from the surface of metal is a reversible reaction, and thus the hydrogen gas content is very important. In order to maintain the reducible atmosphere, the hydrogen gas content has to be maintained at 76% or more. The hydrogen gas is composed of pure hydrogen. In the case where hydrogen resulting from the decomposition of ammonia is used, a desired dew point cannot be ensured.

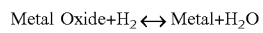

$$\text{Metal Oxide} + H_2 \leftrightarrow \text{Metal} + H_2O \qquad \text{Chemical Reaction 1}$$

More specifically, the dew point functions to increase metal bondability. A dew point of −55° C. or less may decrease the amount of bound oxygen to thereby decrease the oxidation reaction and lower the melting point, thereby further increasing metal bondability. When the dew point is as low as possible, under the condition that it is necessarily −55° C. or less, it is easy to suppress the oxidation reaction.

In the reaction between hydrogen and water as shown in Chemical Reactions 1 and 2, when water is added in a larger amount, the leftward reaction (formation of metal oxide) is carried out. When hydrogen is added in a larger amount, the rightward reaction (formation of pure metal while breaking down metal oxide) is carried out.

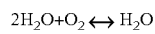

$$2H_2O + O_2 \leftrightarrow H_2O \qquad \text{Chemical Reaction 2}$$

Therefore, maintaining the dew point at −55° C. or less enables the formation of pure metal in a reducible atmosphere containing water vapor at a lower level in the furnace, thereby increasing metal bondability.

Impurities such as oxides are completely removed through the reduction reaction during the brazing process based on the above principle, thus enabling the manufacture of a non-slip plate having excellent non-slip performance and an aesthetically pleasing and shiny outer appearance.

Also, since the brazing process is performed in a hydrogen gas atmosphere, a continuous hydrogen furnace may be used, and mass production is possible.

Figure 2:
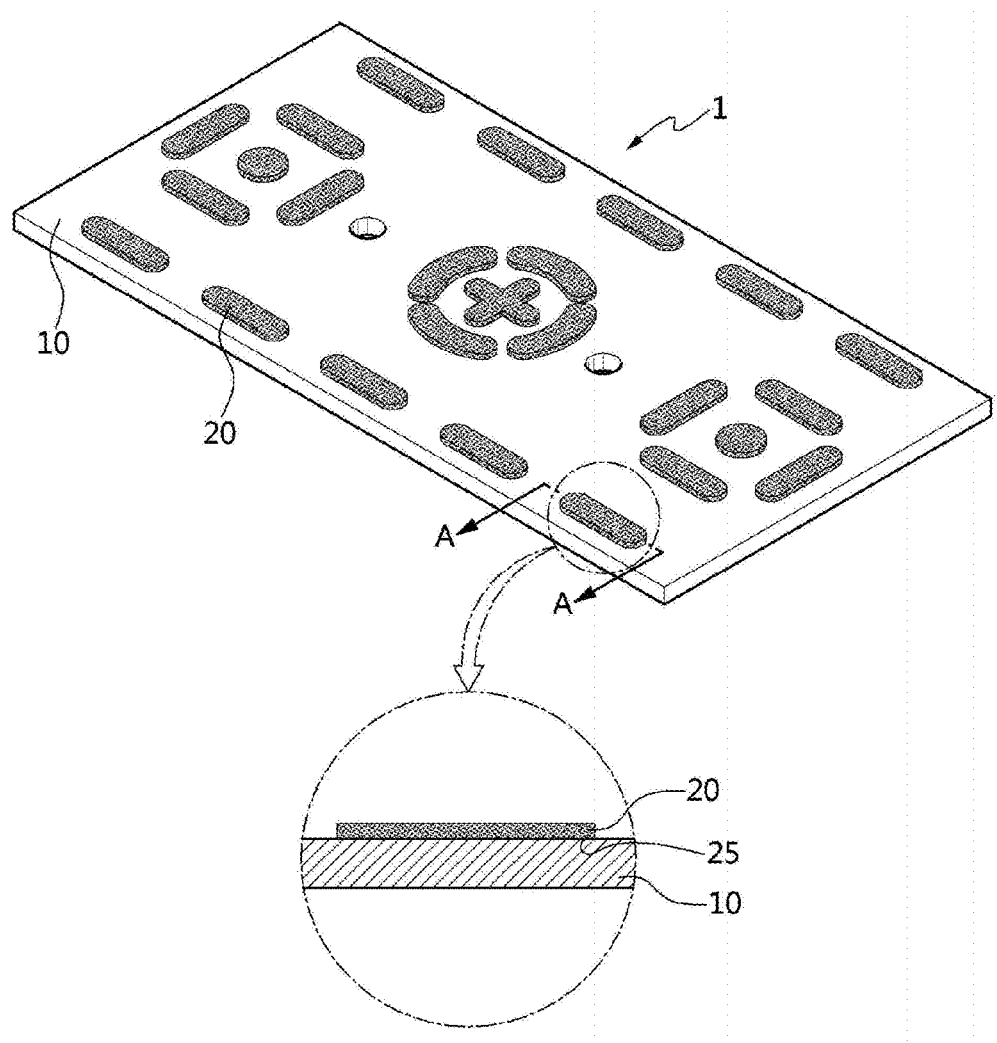
FIG. 2 illustrates a non-slip plate manufactured by the process according to the embodiment of the present invention.

As illustrated in FIG. 2, the non-slip plate 1 manufactured by the above method includes a base metal plate 10 made of stainless steel (e.g. SUS304) and a non-slip part 20 attached to the surface of the base metal plate 10 and made of a W—Ni alloy for imparting non-slip performance.

The base metal plate has a thickness of 1 to 10 mm and the non-slip part has a thickness of 1 to 5 mm.

The joint 25 between the base metal plate 10 and the non-slip part 20 may exhibit superior strength of adhesion by attaching the non-slip material to the base metal plate 10 while melting and sintering the non-slip material during the brazing process.

Also, W attached to the base metal plate 10 is a super-hard powder, and shows superior wear resistance and high non-slip performance.

Below is a description of inventive examples according to the present invention, described together with comparative examples. However, the inventive examples are merely set forth to illustrate the present invention, and are not to be construed as limiting.

The brazing process was performed through primary firing at 600° C. for 10 min in a brazing furnace in a reduction gas atmosphere and secondary firing for 20 min under the condition that the temperature of the brazing furnace was increased to 1300° C.

The non-slip material was automatically applied on the base metal plate and then dried at room temperature, and the solvent was water.

The W powder and the Ni powder had a particle size of less than 10 μm.

was not completely attached to the base metal plate. This is deemed to be because the effect of decreasing the melting point of W powder was deteriorated at a dew point higher than −55° C.

Figure 3:
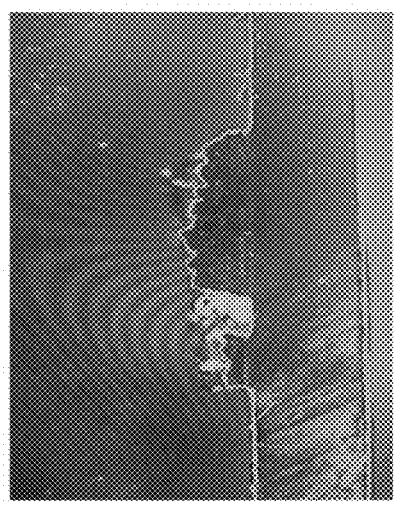
FIGS. 3 and 4 illustrate the joint between a base metal plate and a non-slip material according to the present invention.
Figure 4:
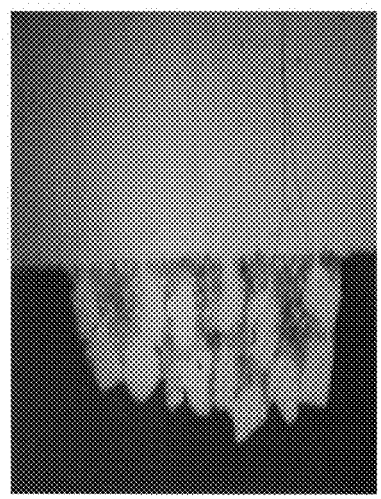

FIGS. 3 and 4 illustrate the joint between the base metal plate and the non-slip material (Inventive Example 1).

As illustrated in FIG. 3, the base metal plate and the non-slip material were integrally and firmly attached to each other. In FIG. 4, which is an enlarged image thereof, the base metal plate was not melted and the non-slip material was melted and sintered, whereby the non-slip material was firmly attached to the base metal plate.

When W powder, which is a super-hard metal, is attached to the base metal plate comprising stainless steel, as in the comparative and inventive examples, the W powder was mixed with 3 to 5 wt % of Ni powder to thereby increase the bonding affinity to stainless steel. Under brazing processing conditions including a dew point of −55° C. or less and a hydrogen gas content of 76% or more, the melting point of W was lowered and the reduction conditions were sufficiently ensured, ultimately enhancing the strength of adhesion between stainless steel and W powder.

Figure 5:
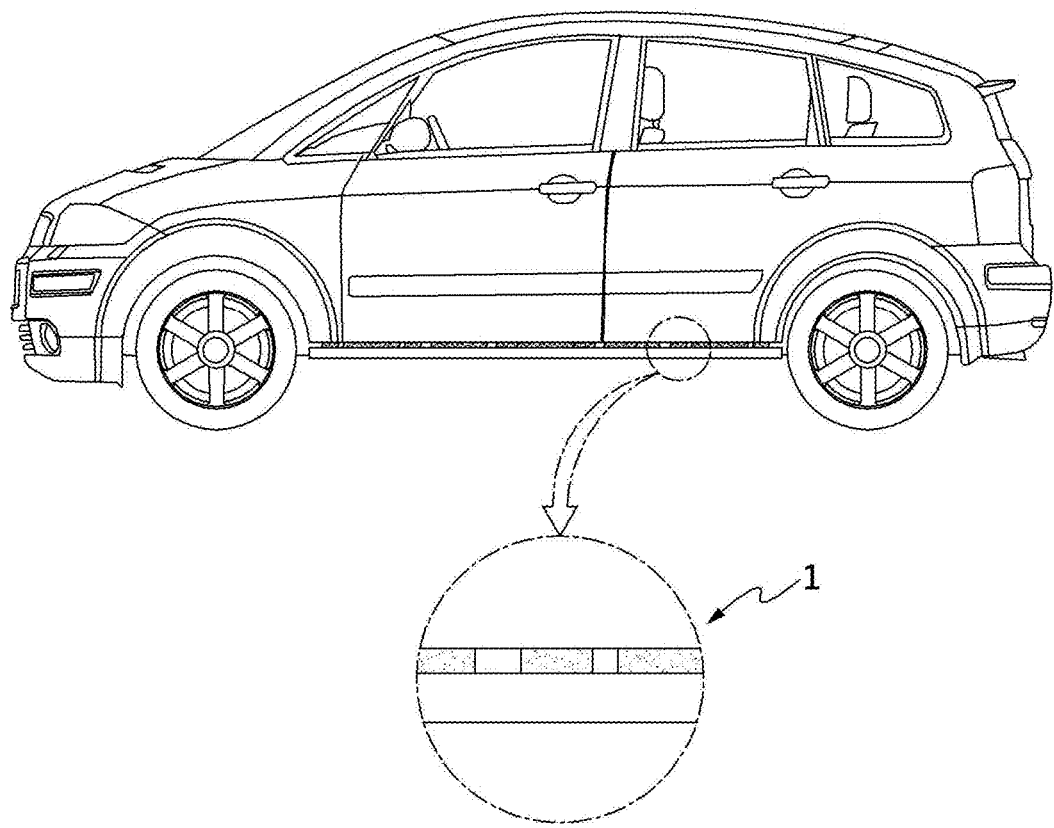
FIG. 5 illustrates the application of the non-slip plate according to the embodiment of the present invention to a vehicle.

As illustrated in FIG. 5, the non-slip plate 1 manufactured by the above method is provided under the door of a vehicle, so that a passenger may safely board the vehicle.

Figure 6:
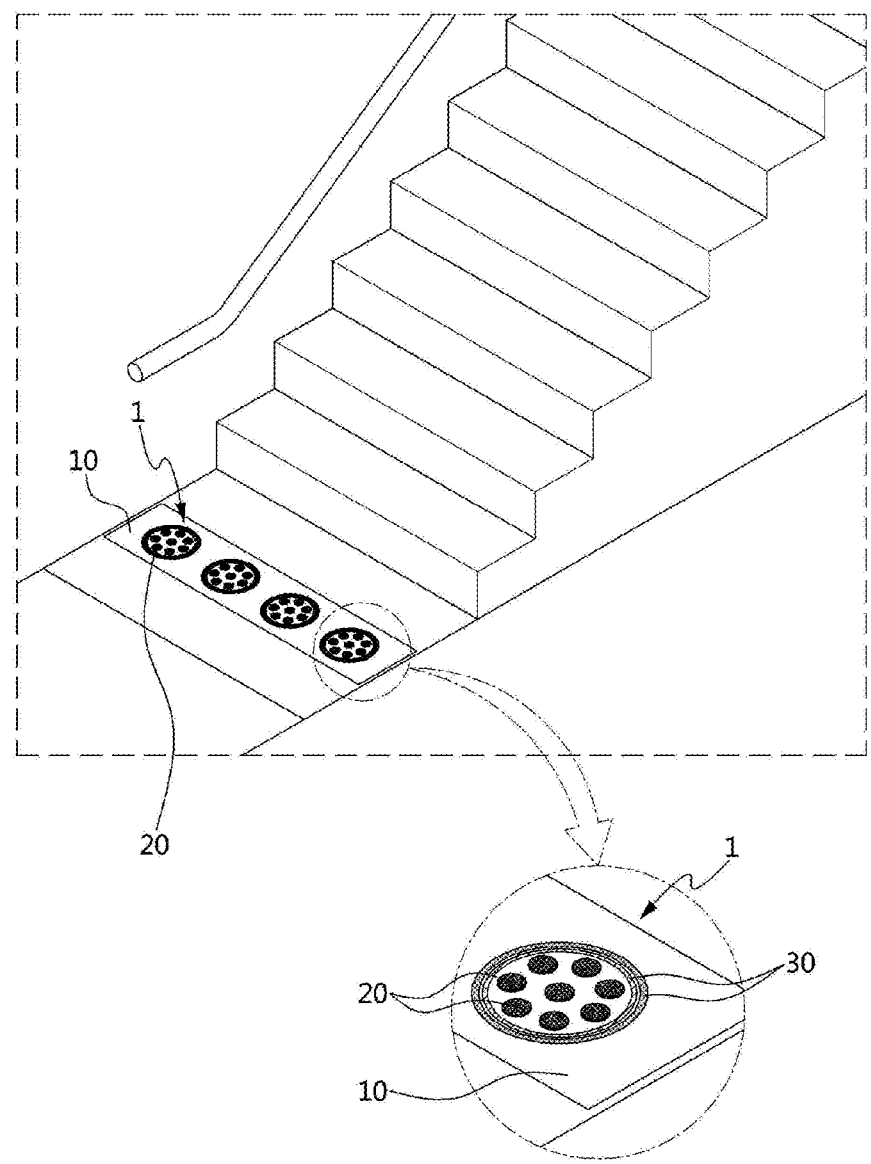
FIG. 6 illustrates the application of the non-slip plate according to the embodiment of the present invention to a subway drain cover.

As illustrated in FIG. 6, the non-slip plate 1 may also be applied to a subway drain cover to thus impart non-slip performance thereto.

TABLE 1

| | | Non-slip material | | Dew | Reduction gas | | |
| | | W powder | Ni powder | point | Hydrogen | Ammonia | |
| | Base metal plate | (wt %) | (wt %) | (° C.) | gas | gas | Adhesion |
| Inv. Ex. 1 | SUS304 | 95 | 5 | −55 | 76 | 0 | High |
| Inv. Ex. 2 | SUS304 | 97 | 3 | −56 | 80 | 0 | High |
| Com. Ex. 1 | SUS304 | 94 | 6 | −55 | 76 | 0 | Peeling |
| Com. Ex. 2 | SUS304 | 98 | 2 | −55 | 76 | 0 | Peeling |
| Com. Ex. 3 | SUS304 | 95 | 5 | −55 | 0 | 76 | Peeling |
| Com. Ex. 4 | SUS304 | 95 | 5 | −55 | 75 | 0 | Partial peeling |
| Com. Ex. 5 | SUS304 | 95 | 5 | −54 | 76 | 0 | Partial peeling |

As is apparent from Table 1, in Inventive Examples 1 and 2, in which the non-slip material comprising 95 to 97 wt % of W powder and 3 to 5 wt % of Ni powder was attached to the base metal plate and then brazed under conditions of a dew point of −55° C. or less and a hydrogen gas content of 76% or more, superior adhesion was exhibited.

However, in Comparative Example 2, containing less than 3 wt % Ni powder, and Comparative Example 1, containing greater than 5 wt % Ni powder, poor adhesion resulted.

In Comparative Example 3, in which ammonia gas was used as a reduction gas, the non-slip material was not attached to the base metal plate. The reduction reaction did not occur in an ammonia gas atmosphere, and thus the W powder was not sintered.

In Comparative Example 4, using hydrogen gas content of less than 76%, the reduction did not sufficiently occur, sintering was inefficient, and some peeling occurred.

In Comparative Example 5, the dew point was higher than −55° C. and some of W and Ni powder was not melted at the secondary firing temperature, and thus the non-slip material The non-slip plate 1 applied to a subway drain cover is manufactured by attaching a W powder to a base metal plate 10 made of stainless steel to form a non-slip part 20, making it difficult to distinguish the base metal plate 10 from the non-slip part 20 because of their similar colors. Thus, the base metal plate 10 is subjected to color laser marking 30 to form a circular shape around the non-slip part 20 or a company logo to be displayed, thus making the non-slip part 20 distinguishable from the base metal plate. In this case, the non-slip part 20 may be highly noticeable, and the non-slip plate may be utilized for corporate advertising.

The non-slip plate 1 may be attached to stairs or lifts, and may thus exhibit non-slip performance when rain or snow falls.

As described above, in order to realize adhesion, an aesthetic outer appearance, and mass production, the base metal plate is preferably made of stainless steel, that is, SUS304, and the non-slip material is configured such that 95 to 97 wt % of W and 3 to 5 wt % of Ni powder are mixed and diluted with a solvent, and the brazing furnace contains a hydrogen gas of 76% or more, and has a dew point of −55° C. or less.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a non-slip plate, comprising:
    preparing a base metal plate, wherein the base metal plate comprises Cr and Ni;
    preparing a non-slip material, wherein the non-slip material is configured such that a tungsten powder, at least one metal powder selected from the group consisting of silver, copper, zinc, cadmium, phosphorus, nickel, manganese, tin, indium, gold, silicon, palladium, and lithium, and a solvent are mixed,
    adhering the non-slip material to a bonding surface of the base metal plate to form a protrusion;
    brazing the non-slip material to the base metal plate in a brazing furnace,
    wherein the brazing comprises
        primary firing at 500 to 700° C. in a brazing furnace in a reduction gas atmosphere and
        secondary firing in the brazing furnace at a temperature increased 900 to 1350° C.,
    wherein the reduction gas is a hydrogen gas,
    wherein the hydrogen gas is used in an amount of 76% or more, and
    wherein a dew point is −55° C. or lower;
    and
    marking around the non-slip plate to distinguish from the base metal by a laser.

2. The method of claim 1, wherein the non-slip material is configured such that 95 to 97 wt % of a tungsten power and 3 to 5 wt % of a nickel powder are mixed and diluted with a solvent.

3. The method according to claim 1, wherein the base metal plate comprises stainless steel.

4. The method according to claim 1, wherein the base metal plate consists of SUS304.

* * * * *